(12) United States Patent
Kim et al.

(10) Patent No.: US 11,137,325 B2
(45) Date of Patent: Oct. 5, 2021

(54) CONTINUOUS ISOKINETIC SAMPLE DEVICE FOR STACK GAS HAVING SUCTION NOZZLE TO WHICH SECTIONAL AREA CONTROL DEVICE IS ATTACHED, AND AUTOMATIC CONTINUOUS MEASUREMENT SYSTEM FOR FINE DUST IN STACK GAS COMPRISING SAME COMBINED THEREWITH

(71) Applicant: CHUNG ENGINEERING CO. LTD, Suwon-si (KR)

(72) Inventors: Keun Sik Kim, Suwon-si (KR); Dae Woong Kim, Hwaseong-si (KR)

(73) Assignee: CHUNG ENGINEERING CO. LTD, Suwon-si (KR)

( * ) Notice: Subject to any disclaimer, the term of this patent is extended or adjusted under 35 U.S.C. 154(b) by 0 days.

(21) Appl. No.: 16/644,820

(22) PCT Filed: Aug. 31, 2018

(86) PCT No.: PCT/KR2018/010137
§ 371 (c)(1),
(2) Date: Mar. 5, 2020

(87) PCT Pub. No.: WO2019/050220
PCT Pub. Date: Mar. 14, 2019

(65) Prior Publication Data
US 2020/0378874 A1    Dec. 3, 2020

(30) Foreign Application Priority Data

Sep. 5, 2017 (KR) .................... 10-2017-0113404

(51) Int. Cl.
*G01N 1/24* (2006.01)
*G01N 1/22* (2006.01)

(52) U.S. Cl.
CPC ............. *G01N 1/24* (2013.01); *G01N 1/2258* (2013.01); *G01N 2001/227* (2013.01)

(58) Field of Classification Search
CPC ... G01N 2001/227; G01N 1/2258; G01N 1/24
(Continued)

(56) References Cited

U.S. PATENT DOCUMENTS

| | | | | |
|---|---|---|---|---|
| 3,965,748 A * | 6/1976 | Boubel | ............... | G01N 1/2247 73/863.03 |
| 4,091,835 A * | 5/1978 | Frampton | .............. | G05D 7/012 137/499 |

(Continued)

FOREIGN PATENT DOCUMENTS

| | | |
|---|---|---|
| JP | 2001-188031 A | 7/2001 |
| JP | 2002-340747 A | 11/2002 |

(Continued)

OTHER PUBLICATIONS

Korean Notice of allowance for 10-2017-0113404 dated Jul. 16, 2019.

(Continued)

*Primary Examiner* — Nimeshkumar D Patel
*Assistant Examiner* — Nashmiya S Fayyaz
(74) *Attorney, Agent, or Firm* — Sughrue Mion, PLLC

(57) ABSTRACT

Provided is a continuous isokinetic sampling device of a stack gas having a suction nozzle to which a cross-sectional area control device is attached, and a continuous automatic measurement system of fine dusts in the stack gas combined with the same, the device and system being configured to continuously separate and automatically measure the suspended particles into PM10 (Particulate Matter Less than 10 μm) and PM2.5 (Particulate Matter Less than 2.5 μm) by introducing a suction gas into a particle size separation device (cascade Impactor) at a constant flow rate of 16.67

(Continued)

l/min, simultaneously with removing an measurement error caused due to inertia force of the suspended particles by automatically adjusting the cross-sectional area of the suction nozzle to suck the sample at the same flow rate as that of the stack gas in the stationary source emissions.

1 Claim, 5 Drawing Sheets

(58) Field of Classification Search
USPC .............. 73/863.03, 863.58, 28.01, 863.51
See application file for complete search history.

(56) References Cited

U.S. PATENT DOCUMENTS

| | | | | |
|---|---|---|---|---|
| 5,481,357 | A * | 1/1996 | Ahsan | G01N 15/0205 |
| | | | | 356/246 |
| 2002/0166365 | A1 | 11/2002 | Kogure et al. | |
| 2020/0217770 | A1* | 7/2020 | Klinder | G01N 15/0211 |

FOREIGN PATENT DOCUMENTS

| | | |
|---|---|---|
| JP | 2004-077137 A | 3/2004 |
| JP | 2004-191204 A | 7/2004 |
| JP | 2016-118459 A | 6/2016 |
| KR | 10-0872151 B1 | 12/2008 |
| KR | 10-2018-0076667 A | 7/2018 |

OTHER PUBLICATIONS

Korean Office Action for 10-2017-0113404 dated Nov. 19, 2018.
International Search Report for PCT/KR2018/010137 dated, Jan. 2, 2018 (PCT/ISA/210).

* cited by examiner

CONTINUOUS ISOKINETIC SAMPLE DEVICE FOR STACK GAS HAVING SUCTION NOZZLE TO WHICH SECTIONAL AREA CONTROL DEVICE IS ATTACHED, AND AUTOMATIC CONTINUOUS MEASUREMENT SYSTEM FOR FINE DUST IN STACK GAS COMPRISING SAME COMBINED THEREWITH

Continuous isokinetic sample device for stack gas having suction nozzle to which sectional area control device is attached, and automatic continuous measurement system for fine dust in stack gas comprising same combined therewith

CROSS REFERENCE TO RELATED APPLICATIONS

This application is a National Stage of International Application No. PCT/KR2018/010137 filed Aug. 31, 2018, claiming priority based on Korean Patent Application No. 10-2017-0113404, filed Sep. 5, 2017, the entire of which is incorporated herein by reference.

FILED OF THE INVENTION

The invention relates to a continuous isokinetic sampling device of a stack gas having a suction nozzle to which a cross-sectional area control device is attached, and is also directed to the continuous isokinetic sampling device of the stack gas having the suction nozzle to which the cross-sectional area control device is attached, characterizing by attaching a cross-sectional area ratio control device of a suction nozzle based on a flow rate of the stack gas to a front end of a sampling tube so as to measure the flow rate of the stack gas to maintain the measured flow rate and the isokinetic suction.

BACKGROUND OF THE INVENTION

So far, total suspended particles have been measured. However, as the importance of fine dusts is gradually increasing, there is a need to continuously measure the fine dusts separated by PM10 nm or less.

Generally, measurement of the fine dusts in an atmosphere or an indoor environment is standardized (EPA standard in the U.S.A. and EN12341 in Europe), and is separated into PM10 nm or less for continuous measurement. However, the fine dusts in a stack gas emitted from smokestacks and other industrial sources was not able to measure precisely and continuously with minimum measurement error due to conflicting constraints between the sampling stage and the separation stage.

The conflicting constraints that restrict the continuous measurement are as follows.

First, in case of the sampling stage of sampling the suspended particles as shown in FIG. 5, if the sampling flow rate is different from that of the emission source, an error occurs due to an inertial force.

A method for minimizing such an error is to perform an isokinetic sampling. The existing isokinetic sampling adopts a method of calculating a design capacity of the smokestacks and other industrial sources as the main emission source, and then manually inserting a nozzle caliber that is the most suitable for emission capacity of the smokestacks and other industrial sources into a measuring tube by selecting one of the existing multiple nozzle calibers consisting of 5 or 6 and operating it.

During sampling with the fixed nozzle caliber, since a flow rate of the stack gas from the smokestacks and other industrial sources as the emission source frequently changes, it is necessary to replace the nozzle caliber that is suitable for the changed flow rate in principle. However; due to the impossibility of replacing the fixed nozzle, the suction flow rate is changed using a pump to reduce the measurement error. More specifically, the sampling flow rate should be changed within a range that satisfies the isokinetic suction flow rate (allowable range: 95% to 110%) which passes through the suction nozzle at the same flow rate as that of the emission source.

Second, in case of the separation stage, a flow rate passing through a cascade Impactor (hereinafter, referred to as Impactor) as a fine dust separation device needs to be maintained at a constant flow rate of 16.67 l per minute to separate the particles, which enables sampling or continuous measurement at a rear end of the device.

In summary, in order to sample the suspended particles through the fixed nozzle caliber without measurement error thereof, it is necessary to carry out the sampling "change" in proportion to the frequent change in flow rate of the stack, gas. However, the continuous separation and the automatic measurement of the sampled/suspended particles with PM10 (particulate matter less than 10 μm) and PM2.5 (particulate matter less than 2.5 μm) require inflow of the suspended particles into the cascade Impactor with a 'constant flow rate' of 16.67 l/min, which results in contradicting each other and being difficult to measure.

In order to settle the two conflicting constraints, the following flow rate measurement equation is most basically used: Q (flow rate)=A (cross-sectional area of the suction nozzle)*V (instantaneous flow rate)*K (compensation coefficient). In the prior art, the was calculated depending on change of the V by using the A as a fixed integer and the K as the same measurement condition (temperature, pressure), so that the isokinetic suction was induced by adjusting a control valve installed at a front end of the pump. However, in the present invention which uses the flow rate measurement equation, first, the Q (flow rate) is set to a constant flow rate of 16.67 l/min which is the required the flow rate of the Impactor, and second, for the isokinetic suction flow rate of the emission source, since the V, the flow rate of the emission source, varies with a load of the process, the flow rate measured by a flow rate meter is substituted to the above equation to easily obtain a cross-sectional area of the nozzle required as a variable.

In view of this, if a cross-sectional area automatic controller of the nozzle is used to adjust the A (cross-sectional area of the nozzle) within the range of 95% to 110%, the allowable error range of the isokinetic suction flow rate, the two conflicting constraints can be settled to enable a new method for automatically sampling and continuously measuring a concentration of the fine dusts in the stack gas. (If a conventional pitot tube, differential pressure gauge, and dry gas meter are used to calculate the isokinetic suction flow rate equation, the equation should be calculated in consideration of multiple variables such as a temperature, a pressure, a differential pressure, a constant pressure, and a gauge pressure. However, a thermal mass flowmeter can measure the precise flow rate of a fluid only with compensation c a gas density for the floe rate value regardless f temperature and pressure.)

As an embodiment of a device for sampling substances contained in such a stack gas, there is disclosed Korean Registration Patent No. 10-1250249 entitled "Sampling device for suspended particles contained in a stack gas".

SUMMARY OF THE INVENTION

The present invention has been made to solve the above-mentioned problem. The purpose of the present invention is to provide a continuous isokinetic sampling device of a stack gas having a suction nozzle to which a cross-sectional area control device is attached, thereby satisfying both of an isokinetic suction flow rate and a constant suction flow rate using an automatic control device 102 of the suction nozzle caliber. A total dust measurement process of the prior art consists of measuring a flow rate with a pitot tube 302 and a differential pressure gauge 305, and adjusting a flow rate control valve 308 substituted with a single standard nozzle 301 caliber and installed at a front end of a pump 309 to integrate and measure the isokinetic suction flow rate with a dry gas meter 311. However, the constant suction flow rate of the Impactor, a fine dust separation device, must also be satisfied to measure the fine dusts linked by the same process.

Further; the present invention is to provide a continuous isokinetic sampling device of a stack gas having a suction nozzle to which a cross-sectional area control device is attached, wherein, in order to comply a constant suction flow rate of 16.67 l/min required by the Impactors 201 and 202 with a isokinetic suction flow rate of the stack gas in a state in which the flow rate control valve 308 in the suction device has already been used, the cross-sectional area of the suction nozzle caliber must be applied as a variable such that the smooth isokinetic suction can be satisfied.

Further, the present invention provides a continuous isokinetic sampling device of a stack as having the suction nozzle to which the cross-sectional area control device is attached, wherein the suction nozzle is replaced with a calculated nozzle under a nozzle change mode immediately after the isokinetic suction tolerance exceeds a range from 95% to 110% required by the Pollution Process Test Method, or is adjusted in proportional control immediately after the required suction nozzle area is calculated by operating an automatic nozzle area control device.

Furthermore, the present invention provides a precise automatic continuous, measurement system of fine dusts in the stack gas, which minimize a measurement error by satisfying a constant flow rate requirement of 16.67 l/min for suction gas flow rate of a cascade impactor without changing the sampling flow rate, simultaneously with achieving isokinetic sampling by automatically adjusting a cross-sectional area of the nozzle to maintain the same flow rate as that of a emission source.

In order to settle the above problem; a continuous isokinetic sampling device of a stack gas having the suction nozzle to which the cross-sectional area control device is attached according to the present invention is characterized by attaching a suction nozzle cross-sectional area ratio control device varying with a flow rate of the stack gas to a front end of a sampling tube so as to measure the flow rate of the stack gas and maintain the measured flow rate and the isokinetic suction.

Further, a position control slide bar 105, a knob position control device 106, and a nozzle cross-sectional area control knob 102 are characterized by being provided to create a nozzle cross-sectional area required in a specific mathematical equation for satisfying the isokinetic suction flow rate 210 of the stack gas calculated by measurement of a flow rate meter 109 and the constant suction flow rate required by a particle size separation device 201, wherein a nozzle caliber is changed as a means for adjusting the isokinetic suction flow rate under the constant flow rate condition.

Furthermore, the isokinetic suction flow rate is characterized by being sucked by mounting multiple nozzles having mutually different specifications as a means for performing the isokinetic suction to the sampling tube, automatically selecting a nozzle calculated based on the flow rate, and automatically changing a caliber of the suction nozzle based on the flow rate.

Still furthermore, a flow rate of the emission source, a flow rate of an automatic sample suction device, and a flowmeter are characterized by being measured with 109 and 208 without any measurement error even at change in the temperature, pressure, or composition by selecting a boundary-layer method in the thermal mass flowmeter of the same measurement method.

As described above, according to the present invention, there is an advantage that the flow rate control method can be applied differently in combination with the automatic measurement method of total dust in the emission source and the automatic measurement method of air pollution fine dust stipulated in the Basic Law on Air Pollution Countermeasures, so that a fine dust concentration of the emission source can be automatically measured, thereby linking management of the fine dust concentration of the emission source with data accumulation and process to effectively reduce the fine dust.

DETAILED DESCRIPTION OF THE INVENTION

Figure 1:
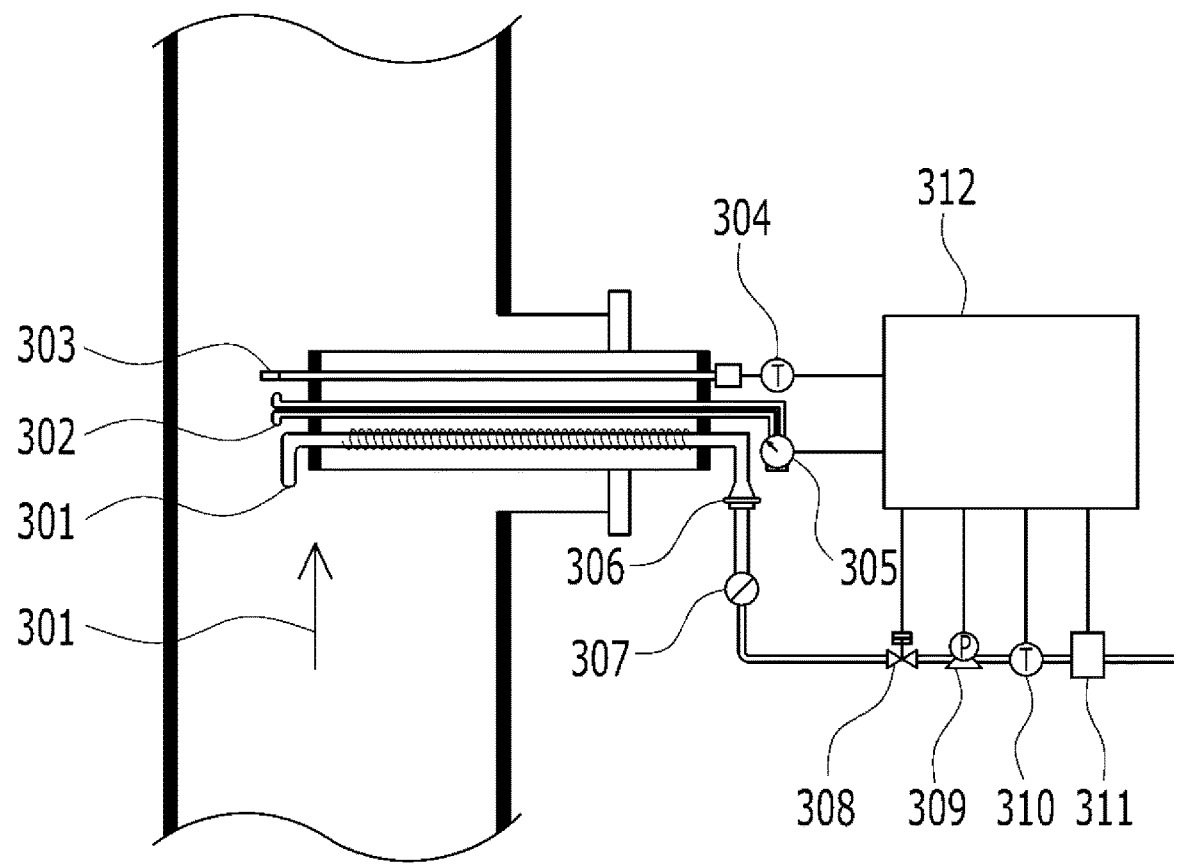
FIG. 1 is a schematic diagram of a conventional sampling device of a stack gas.

Hereinafter, a continuous isokinetic sampling device of a stack gas having a suction nozzle to which a cross-sectional area control device is attached according to an embodiment of the present invention will be described in detail with reference to the attached drawings. Firstly, it should be noted that the same constitutive elements or components in the drawings are indicated by the same reference numerals as much as possible. In describing the present invention, detailed descriptions related to known functions or constitutions are omitted so as not to obscure the gist of the present invention.

Figure 2:
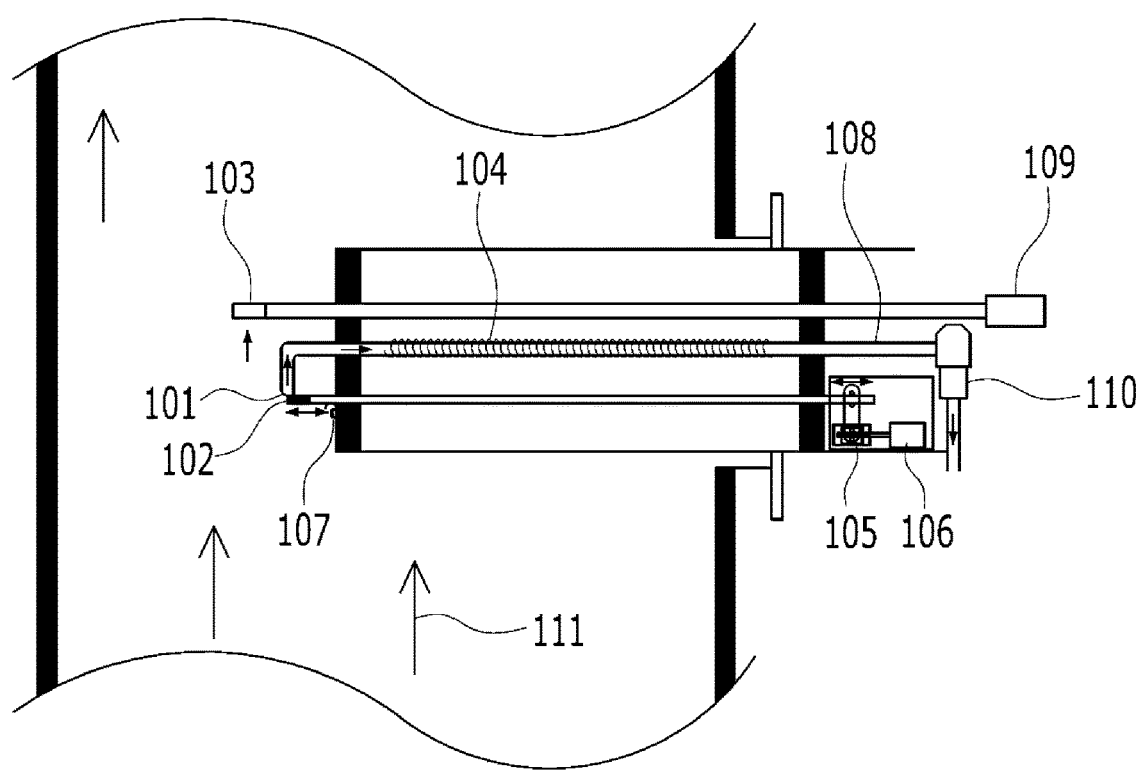
FIG. 2 is a structural diagram of a continuous isokinetic sampling device of a stack gas having a suction nozzle to which a cross-sectional area control device is attached, according to a preferred embodiment of the present invention.
Figure 3:
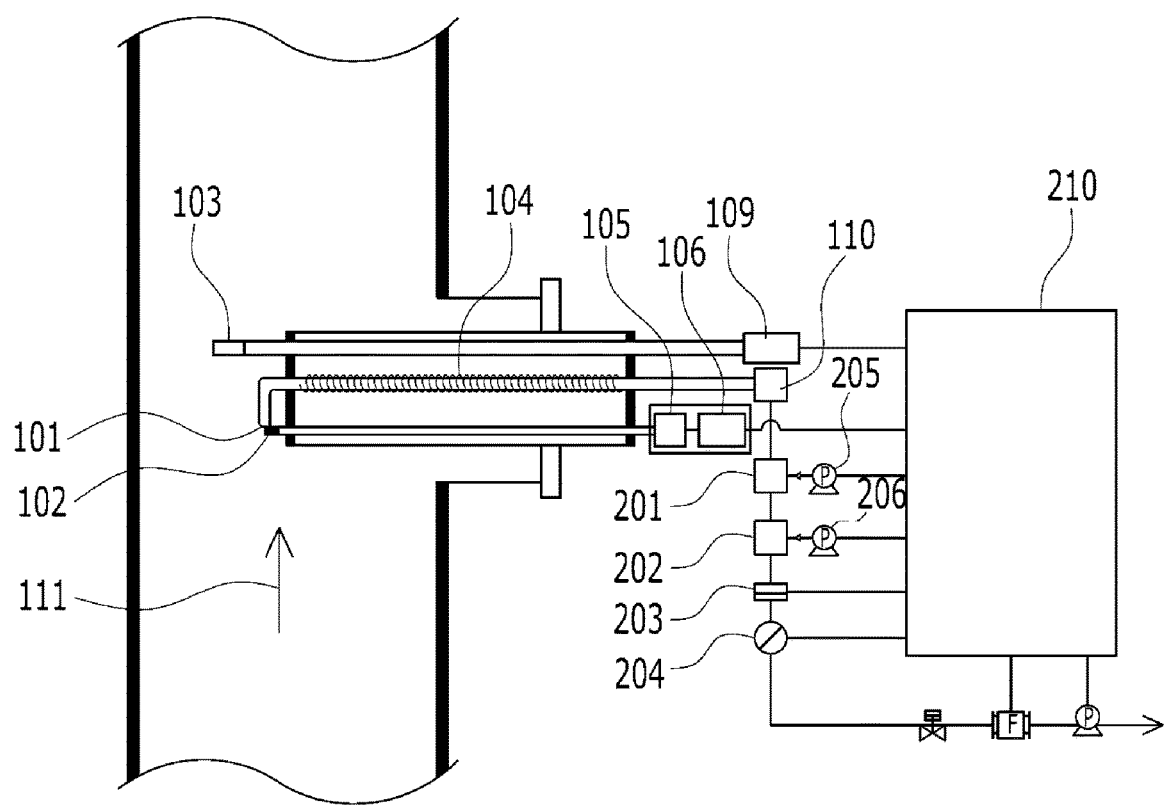
FIG. 3 is a structural diagram of a continuous automatic measurement system of fine dust in a stack gas comprising a continuous isokinetic sampling device of the stack gas having a suction nozzle to which a cross-sectional area control device is attached, according to a preferred embodiment of the present invention.
Figure 4:
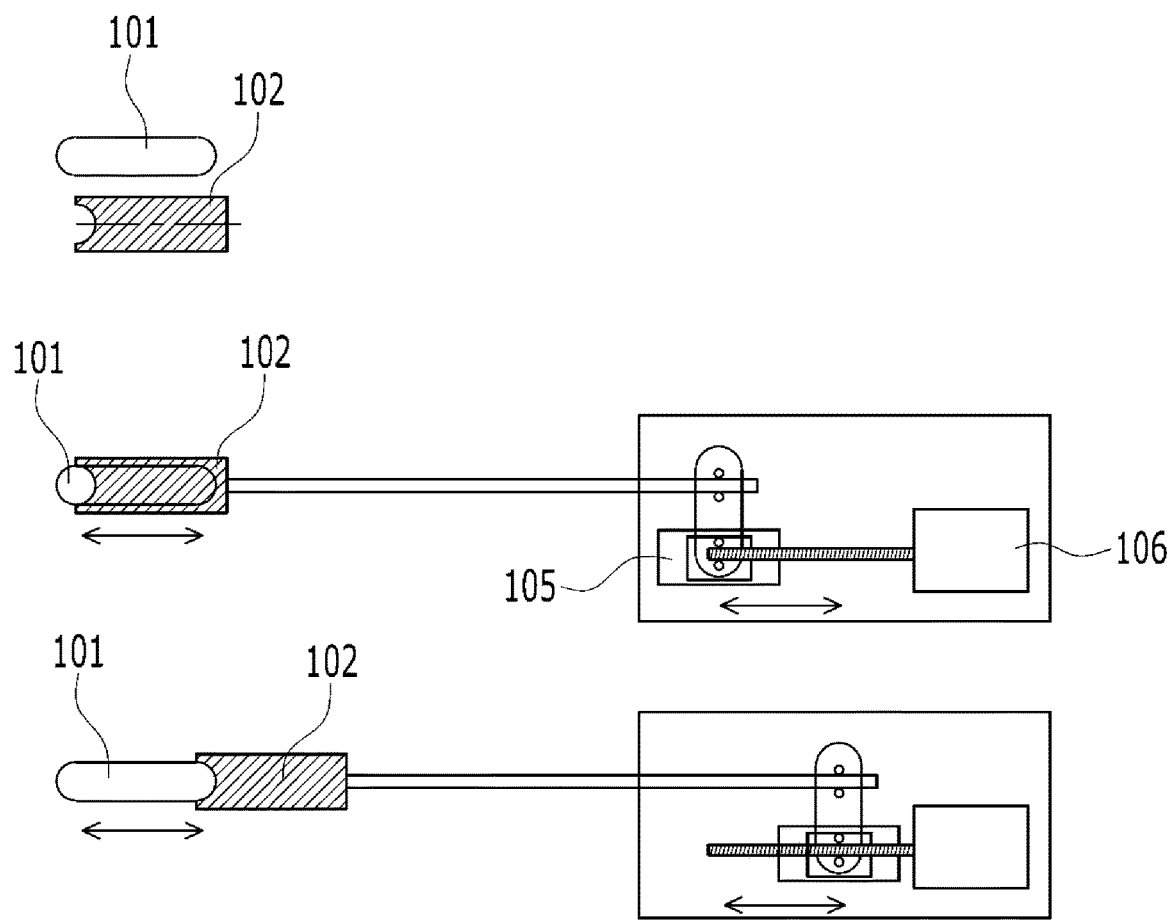
FIG. 4 is a schematic diagram showing a suction nozzle changing device in a structure of a continuous isokinetic sampling device of a stack gas having a suction nozzle to which a cross-sectional area control device is attached, according to a preferred embodiment of the present invention.
Figure 5:
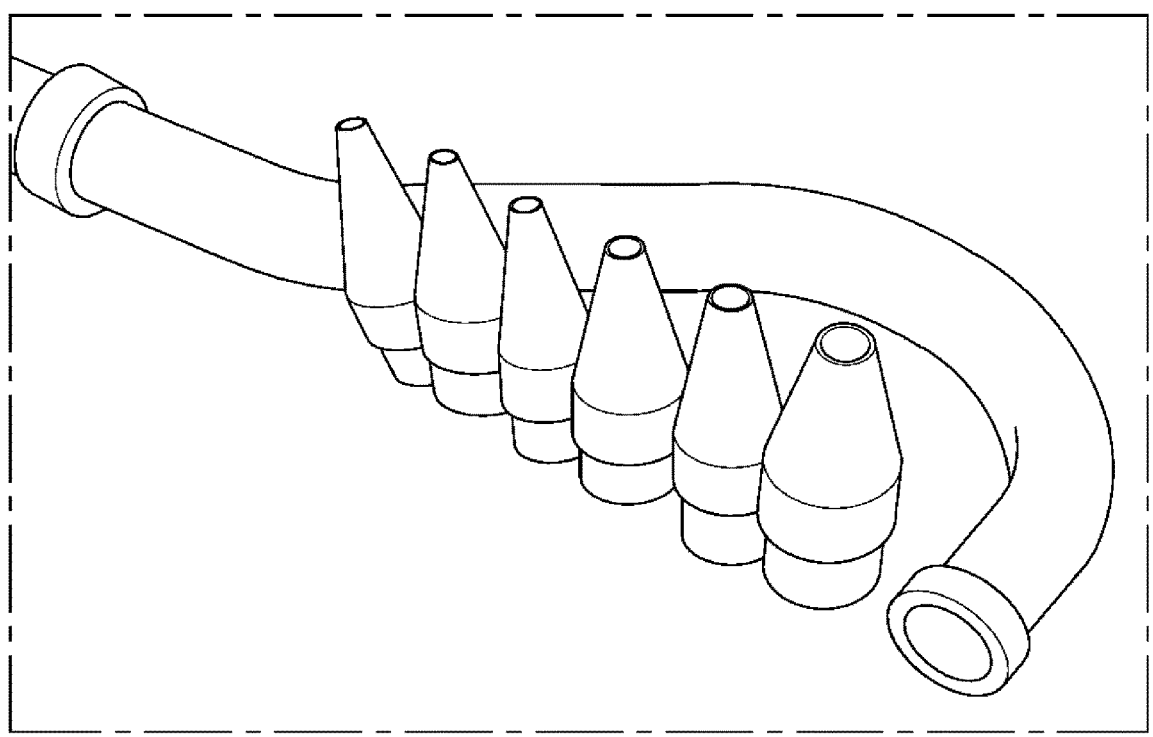
FIG. 5 is a schematic view showing an appearance of a nozzle having a conventionally replaceable tip.

Referring to FIG. 2, a front end of a sampling tube (hereinafter, referred to as a probe) is formed with a flow rate sensor 103, a suction nozzle 101 (an opening at the front end thereof has an oval race track shape as shown in FIG. 4), a cross-sectional area control knob 102 of the suction nozzle, and a knob stabilization spring 107 and are directly exposed to smokestacks and other industrial sources. The inside of the probe are configured to heat the sampling tube 104 made of an acid-resistant material.

Meanwhile, it is preferred that a rear end of e probe Is composed of a thermal mass flowmeter 109 and a suction gas constant temperature device 110 and is combined with a knob control slide bar 105 and a knob position control device 106.

The key of the sampling tube according to the present invention is to maintain the isokinetic suction flow rate of the stack gas while maintaining the constant suction flow rate required by the Impactors 201 and 202. As a means for satisfying these two requirements, if the constant suction flow rate (16.67 l/min) is set as an integer and a flow rate signal measured by the thermal mass flowmeter 109 is received so that the isokinetic suction flow rate is calculated in the control unit 210, followed by calculating a cross-sectional area of the suction nozzle, it is possible to interlock with the isokinetic suction by precisely adjusting the suction area while horizontally moving the cross-sectional area of the suction nozzle 101 to the left and right with the control knob 102.

In this process, adjustment of the knob position is made up of a position control slide lever 105 and a knob position control device 106 connected to the knob, and is completed by precisely adjusting a value calculated and instructed by the control unit 210. (The importance of isokinetic suction flow rate is that if the suction flow rate is greater than the emission flow rate in the process of sucking a sample gas from the emission source, light particles are mainly sucked and large particles are not sucked due to inertia, which results in the measurement value lower than the actual concentration. Conversely, if the suction flow rate is lower than the emission flow rate, the measurement value becomes higher than the actual concentration. Therefore, in order to measure the concentration equal to the emission source, the emission flow rate and the nozzle suction flow rate are is specified in the range of 95% to 110% by the Pollution Process Test Method.)

FIG. 2 is a structural diagram of a system comprising a sampling and automatic suction device according to the present invention. A sample gas, introduced from, the sampling device first passes through the PM10 impactor 201 followed by the PM2.5 impactor 202. (The particle separation device (Impactor) applies the law of inertial collision of particles. When a fluid flow direction is rapidly changed, large particles have the property of going straight due to a gravity and an inertial force, and are collected by collision of the particles with a capture plate, whereas light particles are emitted together with the fluid. Therefore, an inflow rate of the fluid and a design on the structure and size of the device are extremely important.)

The sample gas containing fine dusts separated by the impactor is collected by a standard filter paper in a sample capture filter 203, and then a total suction flow rate and a dust weight difference are calculated by a weight measurement method to obtain a fine dust concentration. This is referred to a sampling process.

Meanwhile, it is preferred that the present invention not only sample the sample based on the gravimetric method, but also replace the capture filter 203 with a linear tube and guide it to a continuous automatic measurement device.

(The smokestacks and other industrial sources emits dusts composed of various particle sizes. Most of the large particles of 70 μm or more naturally fall to a short distance due to the weight of the particles. However, the fine particles of 70 μm or less are suspended in the air, causing a variety of problem. Among them, the fine dusts of PM2.5 or less easily reacts with other compounds to cause secondary pollution. In addition, it passes through human lung sac and seriously affects public health, so it needs to be managed.)

Meanwhile, the sample gas passing through the Impactor passes a beta-line dust meter equipped with a fine dust measurement sensor 204 to automatically measure a concentration of the dust, and then transmits the data to a panel PC.

In this case, in order to adjust the constant suction flow rate of the Impactors 201 and 202, the thermal mass flowmeter 208 measures a flow rate of the sample gas sucked by a suction pump 209, and then transmits an instantaneous flow rate signal to a control device 210. A flow rate control valve 207 is controlled to suck at a constant suction flow rate of 16.67 l per minute.

FIG. 1 is a schematic diagram of a conventional stack gas sampling device. A front end of the sampling tube consists of a suction nozzle 301, a pitot tube 302, and a temperature measurement sensor 303. When the dust (TSP total suspended particles) is measured, a suitable nozzle is selected and installed in a fixed way, temperatures of the pitot tube and the stack gas 304 are measured to substitute them with a value measured by a differential pressure gauge 305 to measure the stack flow rate, and, if the selected (among 4, 6, 8, 10, 12Φ) nozzle and the flow rate are substituted to calculate a isokinetic suction flow rate, the flow rate signal input from a dry gas meter 311 is received so that a flow rate control valve 308 installed at a front end of the pump 309 is adjusted to perform the isokinetic suction.

In this case, the structure is made such that since the dust is used to measure total suspended particles, a sampling filter 306 is installed in the middle and the calculated isokinetic suction flow rate is measured by adjusting it with a valve at the front end of the pump.

That is, the difference between the prior art and the present invention is that the present invention performs suction at a constant flow rate (16.67 l/min) through a flow rate control valve 207 provided at the front end of the pump while the cross-sectional area of the suction nozzle is changed as a means of performing the isokinetic suction, whereas the dust (total dust) measurement method of the prior art is to perform suction by adjusting the calculated suction flow rate through a control valve 308.

On the other hand, the present invention, not only samples the sample based on the gravimetric method, but also takes out the capture filter 203 and replaces it with a linear tube, and then guides it to the continuous automatic measurement device.

The sample gas passing through the Impactor passes the beta-line dust meter equipped with the fine dust measurement sensor 204 to automatically measure a concentration of the dust, and then transmits the data to the panel PC.

In this case, in order to adjust the constant suction flow rate of the fine dust separation device 201 and 202, the thermal mass flowmeter 208 measures a flow rate of the sample gas sucked by a suction pump 209, and then transmits an instantaneous flow rate signal to a control device 210. A flow rate control valve 207 is controlled to suck at the constant suction flow rate of 16.67 l per minute.

The optimal embodiments is disclosed in the drawings and the specification. Although the specific terminologies are used therein, they are only used to explain the present invention and are not intended to limit the meanings thereof or limit the scope of the present invention described in the appended claims. Therefore, any person who has an ordinary knowledge in the art will understand that various modifications and other equivalent embodiments can be performed from them. Thus, the true technical protection scope of the present invention should be determined by the technical ideas of the appended claims.

What is claimed is:

1. A continuous isokinetic sampling device of a stack gas, characterized by comprising
   - a suction nozzle configured to suck the stack gas within a stack;
   - a nozzle cross-sectional area control knob provided outside and at a front end of the suction nozzle;
   - a particle size separation device arranged outside the stack and configured to separate and sample a fine dust from the stack gas sucked by the suction nozzle; and
   - a knob position control device arranged outside the stack and configured to control a position of the nozzle cross-sectional area control knob provided at the front end of the suction nozzle;
   - wherein an opening at the front end of the suction nozzle has an oval race track shape when viewed from a stack gas flow direction, and the nozzle cross-sectional area control knob is provided at the front end of the suction nozzle,
   - the nozzle cross-sectional area control knob has a semi-circle shape formed inwardly toward a center thereof at one end when viewed from the stack gas flow direction,
   - the knob position control device maintains an isokinetic suction with a flow rate of the stack gas within the stack, simultaneously with implementing a constant suction required by the particle size separation device, by controlling the position of the nozzle cross-sectional area control knob to selectively cover a portion of the opening, and adjusting a cross-sectional area of the opening where the stack gas is flown through by means of a position control slide lever.

* * * * *